June 2, 1936.  E. C. HAKE  2,042,656

MULTIPLE WING DISPLAY DEVICE

Filed March 1, 1935

Inventor

Elmer C. Hake

By Murray & Zugelter

Attorneys

Patented June 2, 1936

2,042,656

UNITED STATES PATENT OFFICE 2,042,656

MULTIPLE WING DISPLAY DEVICE

Elmer C. Hake, Covington, Ky.

Application March 1, 1935, Serial No. 8,901

13 Claims. (Cl. 40—102)

This invention relates to a display device of the type which has a series of wings or panels movable relatively in the manner of a book, to display advertising matter or the like carried by the faces of the wings or panels.

An object of the invention is to provide a device of the character stated, which may be inexpensively manufactured with the employment of simple constituents.

Another object of the invention is to provide a simplified multiple wing display device which is exceedingly durable and incapable of sagging or distortion.

Another object of the invention is to provide a device of the character referred to, adjacent wings or panels of which may be moved relatively through circle arcs of at least 180 degrees to fully expose the faces of the wings or panels.

The invention also consists in certain other features of construction and in the combination and arrangement of parts as hereinafter fully described, and illustrated in the accompanying drawing, in which.

Figure 1:
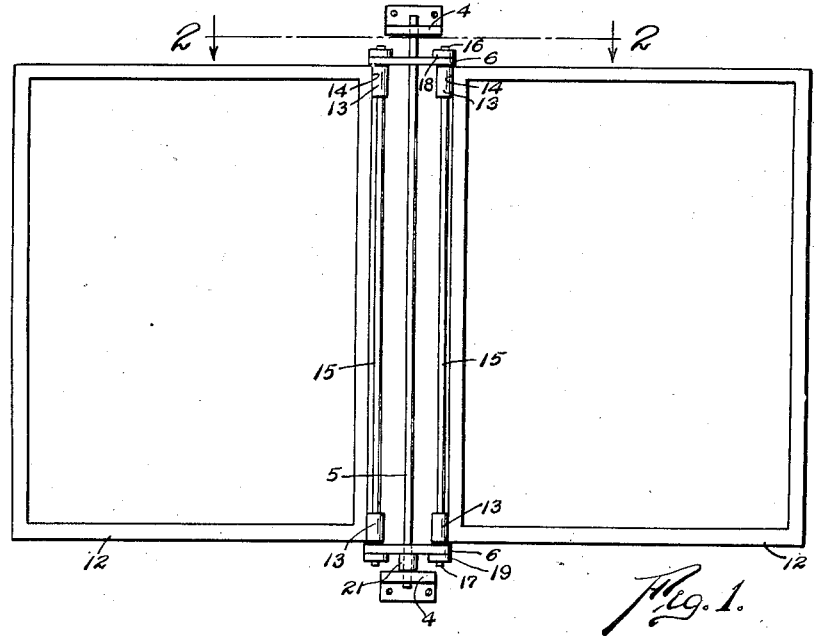
Fig. 1 is a front elevational view of the device, showing the wings or panels extended for display purposes.
Figure 2:
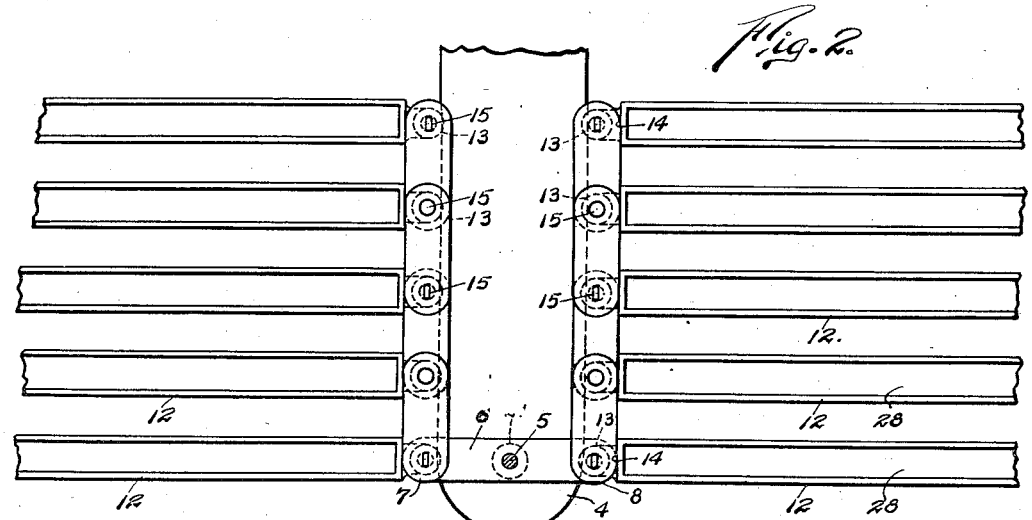
Fig. 2 is an enlarged fragmental cross-sectional view taken on line 2—2 of Fig. 1.
Figure 3:
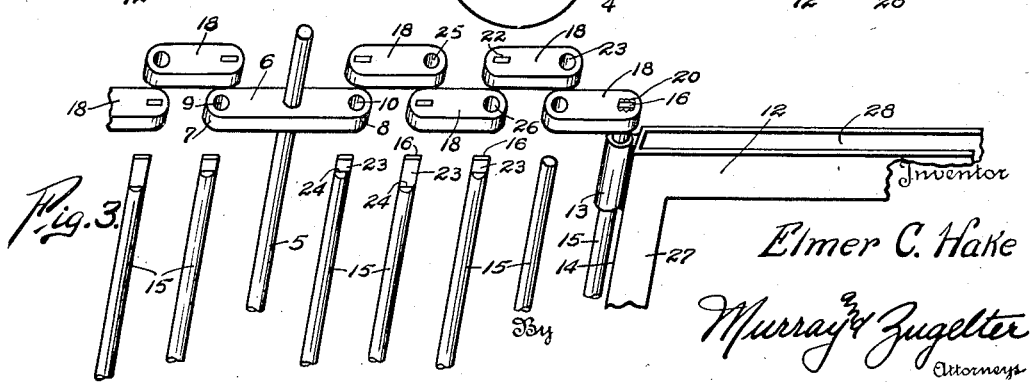
Fig. 3 is a perspective view showing the manner of connecting the various parts, the parts being shown disassociated or slightly separated for the sake of clarity in disclosure.

The device of this invention is presented as an improvement over the class of devices disclosed in the patents of Dunning 1,787,237, Dunning et al., 1,761,661, Feldmann et al., 1,060,443 and Benjamin 943,961. As disclosed herein, the device consists of suitable bracket means 4 which may be mounted upon any upright surface, such as a pedestal or wall, said bracket means being adapted to support a vertical main shaft 5. The shaft, in turn, supports a pair of spaced substantially parallel connecting bars or master links 6, which may be fixed to the main shaft or otherwise arranged to maintain the said bars or master links in spaced parallelism within a vertical plane. Each master link has a pair of ends 7 and 8 which are perforated as at 9 and 10, repectively, to mount a series of connected wing-supporting units. Each unit is constituted of a wing or panel 12 having a fixed sleeve 13 at each end of its back portion 14, and a rod 15 rotatably received in the sleeves so that its upper and lower ends 16 and 17, respectively, may have fixed thereto a pair of links 18 and 19. The links of each unit are fixed to the opposite ends of their associated upright rod, such as 15, so that both links extend from the rod in a common direction, and substantially at right angles to the axis of the rod. The upper half of one of such units is shown at the extreme right of Fig. 3. Since the upper half of the entire device is identical with the lower half, a description of the upper half should suffice. From the foregoing it will be understood that each so-called unit comprises a frame or wing 12, a pair of sleeves fixed to the back of the frame or wing at the upper and lower extremities thereof, a rod rotatably received in the sleeves, and a pair of links each of which is fixed to an end of the rod. In Fig. 3, the upper end of rod 15 is shown fixed to the link 18 by means of a peened connection indicated at 20. It is to be understood, however, that the connection between links and rods may be made by other methods, such as welding, threading, pinning or the like.

As stated before, the spaced substantially parallel connecting bars or master links 6 are adapted to move in unison, wherefore they are preferably fixed upon the main shaft 5. A suitable spacer 21 beneath the lower master link may provide a bearing that permits of free rotation of the main shaft and its associated parts 6. The ends of the main shaft are journaled in the bracket means, as is evident. The corresponding opposite ends of the master links are adapted to support groups of links connected end to end, which links individually are parts of complete units such as is shown at the extreme right of Fig. 3. It is to be understood that each of the rods 15 shown in the Fig. 3 view, will support a wing or panel such as 12 by means of the sleeves associated with such panels. Several wings or panels have been omitted from the Fig. 3 disclosure for the sake of clarity.

Each of the short links 18 has an angularly apertured end 22 and a bored end 23 the angularly apertured ends of the links being adapted to receive the angular opposite ends 23 of the rods so as to preclude relative rotation of the links upon the rod ends. It will be noted that the links at the upper end of the device are in two parallel planes which are located above the upper edges of all the panels, and that the angular apertures of the links which rest in the upper-most plane, are to have secured therein the angular ends 23 of alternate rods 15. In order that the bores of the links which rest in the plane of member 6 may have a suitable bearing upon rods 15, the flattened or angular portions 23 of alternate rods are made sufficiently extensive to be received wholly within an angular aperture such as 22 of a link in the uppermost plane of links. Where the rod ends must first enter an angular aperture before entering a circular bore of a superposed link, for example as indicated at the extreme left of Fig. 3, the flat or angular end of the rod is made about twice as extensive as the flat or angular portions of the other rods. From the foregoing it should be understood that the alternate links which rest in the uppermost plane of links (Fig. 3), have their angularly apertured ends 22 securely fixed to the angular ends of those rods which extend into said angularly apertured ends. As stated before, the fixing or securing at such points may be accomplished by peening, welding, pinning or otherwise. The relationship above described would be obtained by lowering all the links shown in the Fig. 3 view, until said links abutted the shoulders 24 of all the rods, it being necessary, however, to thereafter peen over the ends of those rods which extend into the angular apertures of the links in the upper plane of links.

From the foregoing, it should be evident that the rod 15 which is closest to the main shaft 5 may rotate within the bore 10 of the master link 6, while the first short link 18 rotates with said rod. The second short link will rotate with the second rod 15, by reason of the angular connection at 23, but said second rod and its upper and lower links will rotate within the bore 25 of the first short link. In a similar manner, the third rod 15 and its upper and lower links 18, may rotate within the bore 26 of the second short link 18. This relationship persists regardless of the number of links and rods that may comprise the display device. The sleeves of the various wings or panels supported by the several rods 15, are rotatably associated with their respective rods so that the wings or panels may be rotated relative to the rods regardless of rotation or non-rotation of the rods relative to their supporting links. This construction insures a maximum of movement between adjacent wings or panels, while at the same time the wings or panels are precluded from sagging or becoming out of line.

It is to be observed that the links at the upper end of the device are in planes above the upper edges of all the panels, and the links at the lower end of the device are in planes below the lower edges of all the panels. In other words, the backs of the panels are free of all link connections and of whatever interference necessarily results from hinging the panels at their backs.

The wings or panels 12 may be of any suitable construction, those illustrated being formed of channel elements 27 suitably fastened together to provide a frame with an open top, as indicated at 28 for the reception of sheets or boards that may carry display matter and the like.

What is claimed is:

1. A multiple wing display device comprising in combination: a plurality of wings for the mounting of material to be displayed, bracket means, a main shaft supported by the bracket means, a plurality of spaced substantially parallel connecting bars each mounted intermediate its ends upon the main shaft for rotation relative to the bracket means, and means for rotationally mounting a wing at opposite corresponding ends of the connecting bars.

2. A multiple wing display device comprising in combination: a plurality of wings for the mounting of material to be displayed, bracket means, a main shaft supported by the bracket means, a plurality of spaced substantially parallel connecting bars each mounted intermediate its ends upon the main shaft for rotation relative to the bracket means, means for rotationally mounting a wing at opposite corresponding ends of the connecting bars, groups of connected links mounted upon the connecting bar ends for extension therefrom, and additional wings supported by the links of each group of links.

3. A multiple wing display device comprising in combination: a plurality of wings for the mounting of material to be displayed, bracket means, a main shaft supported by the bracket means, a plurality of spaced substantially parallel connecting bars each mounted intermediate its ends upon the main shaft for rotation relative to the bracket means, means for rotationally mounting a wing at opposite corresponding ends of the connecting bars, groups of connected links mounted upon the connecting bar ends for extension therefrom, and additional wings supported rotatably relative to the links of each group of links.

4. A multiple wing display device comprising in combination: a main shaft and means for supporting the shaft substantially vertically, a plurality of spaced substantially parallel connecting bars each mounted intermediate its ends transversely upon the main shaft so as to occupy a common plane with the axis of the main shaft, a wing-supporting unit comprising a connecting rod with angular opposite ends and a pair of short links each having an angularly apertured end and a bored end, the angularly apertured ends of the links receiving the angular opposite ends of the rod to preclude relative rotation of the links upon the rod ends, said unit being rotatably supported by corresponding ends of the transversely mounted connecting bars, a similar wing-supporting unit rotatably supported in the bored ends of the links of the first unit, and wings for carrying display material, rotatably mounted relative to the rods of the wing-supporting units.

5. A multiple wing display device comprising in combination: a main shaft and means for supporting the shaft substantially vertically, a plurality of spaced substantially parallel connecting bars each mounted intermediate its ends transversely upon the main shaft so as to occupy a common plane with the axis of the main shaft, a wing-supporting unit comprising a connecting rod with angular opposite ends and a pair of short links each having an angularly apertured end and a bored end, the angularly apertured ends of the links receiving the angular opposite ends of the rod to preclude relative rotation of the links upon the rod ends, said unit being rotatably supported by corresponding ends of the transversely mounted connecting bars, a similar wing-supporting unit rotatably supported in the bored ends of the links of the first unit, and wings for carrying display material mounted upon the rods of the wing-supporting units.

6. A multiple wing display device comprising in combination: a main shaft and means for supporting the shaft substantially vertically, a plurality of spaced substantially parallel connecting bars each mounted transversely upon the main shaft so as to occupy a common plane with the axis of the main shaft, a wing-supporting unit comprising a connecting rod having opposite ends, and a pair of short links each having an end fixed upon opposite ends of the rod so that the rod and said links rotate in unison, said unit being rotatably supported by corresponding ends of the transversely mounted connecting bars, a similar wing-supporting unit rotatably supported by the opposite ends of the links of the first unit, and wings for carrying display material, rotatably mounted relative to the rods of the wing supporting units.

7. A multiple wing display device comprising in combination: a main shaft and means for supporting the shaft substantially vertically, a plurality of spaced substantially parallel connecting bars each mounted transversely upon the main shaft so as to occupy a common plane with the axis of the main shaft, a wing-supporting unit comprising a connecting rod having opposite ends, and a pair of upper and lower short links each having an end fixed to an end of the rod at right angles to the rod, to preclude relative rotation of the links upon the rod ends, said unit being rotatably supported by corresponding ends of the transversely mounted connecting bars, a similar wing-supporting unit rotatably supported upon the opposite ends of the links of the first unit, and wings mounted upon the rods of the wing-supporting units for carrying display material.

8. A multiple wing display device comprising in combination: a main shaft and means for supporting the shaft substantially vertically, a plurality of spaced substantially parallel connecting bars each mounted transversely upon the main shaft so as to occupy a common plane with the axis of the main shaft, a wing-supporting unit comprising a connecting rod having opposite ends, and a pair of upper and lower short links each having an end fixed to an end of the rod at right angles to the rod, to preclude relative rotation of the links upon the rod ends, said unit being rotatably supported by corresponding ends of the transversely mounted connecting bars, a similar wing-supporting unit rotatably supported upon the opposite ends of the links of the first unit, and wings mounted upon the rods of the wing-supporting units for carrying display material, said wings being disposed wholly between the planes of the said upper and lower short links.

9. A multiple wing display device comprising in combination: a plurality of wings for the mounting of material to be displayed, bracket means, a main shaft supported by the bracket means, a plurality of spaced substantially parallel connecting bars each mounted intermediate its ends upon the main shaft for rotation relative to the bracket means, means for rotatably mounting a wing at opposite corresponding ends of the connecting bars, upper and lower groups of connected links mounted upon the connecting bar ends for extension therefrom, and additional wings supported between said groups of links.

10. A multiple wing display device comprising in combination: a plurality of wings for the mounting of material to be displayed, bracket means, a main shaft supported by the bracket means, a plurality of spaced substantially parallel connecting bars each mounted intermediate its ends upon the main shaft for rotation relative to the bracket means, means for rotatably mounting a wing at opposite corresponding ends of the connecting bars, upper and lower groups of connected links mounted upon the connecting bar ends for extension therefrom, and additional wings rotatably supported between said groups of links.

11. In a display device, a unit comprising in combination a display panel having a rear edge, bearing means along the said rear edge of the panel, a mounting rod associated with the bearing means for relative rotational movement, and a link fixed upon each extremity of the rod, said links being substantially at right angles to the rod and extending in a common direction therefrom.

12. In a display device, a unit comprising in combination a display panel having a rear edge, bearing means disposed in parallelism with said rear edge, a mounting rod associated with said bearing means for relative rotation, said rod being longer than the rear edge of the panel, and a plurality of links, one being fixed substantially at right angles upon each extremity of the rod and extending in a common direction from the rod axis, so that rotation of the rod moves the links in unison.

13. In a display device, a unit comprising in combination a display panel having a rear edge, bearing means disposed in parallelism with said rear edge, a mounting rod associated with said bearing means for relative rotation, said rod being longer than the rear edge of the panel, and a plurality of links, one being fixed substantially at right angles upon each extremity of the rod and extending in a common direction from the rod axis, so that rotation of the rod moves the links in unison, and means on each link for supporting the rod of a similar unit.

ELMER C. HAKE.